June 11, 1963  J. DE FORAS  3,093,074
MEANS FOR PROTECTING FLIGHT VEHICLES FROM INJURY
ATTRIBUTABLE TO HEAT OF AIR FRICTION
Filed Jan. 8, 1960
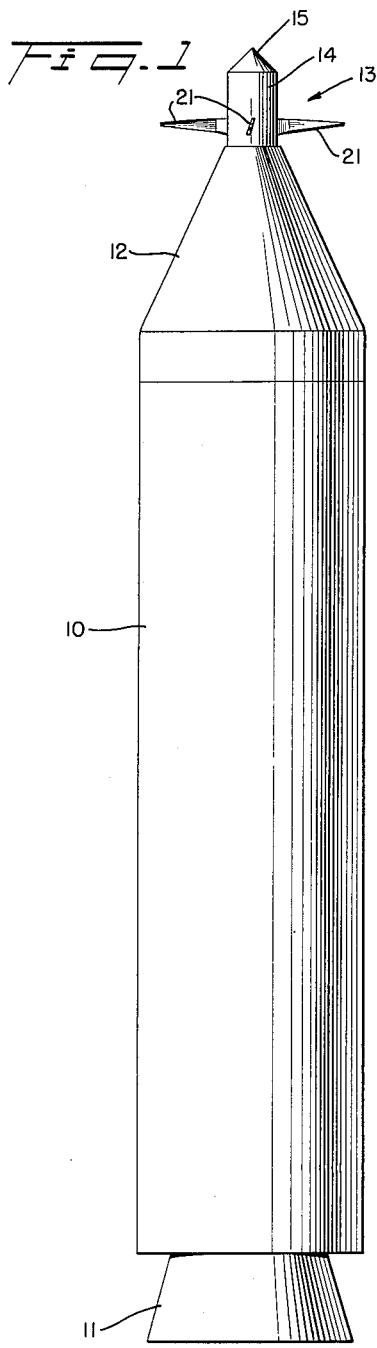
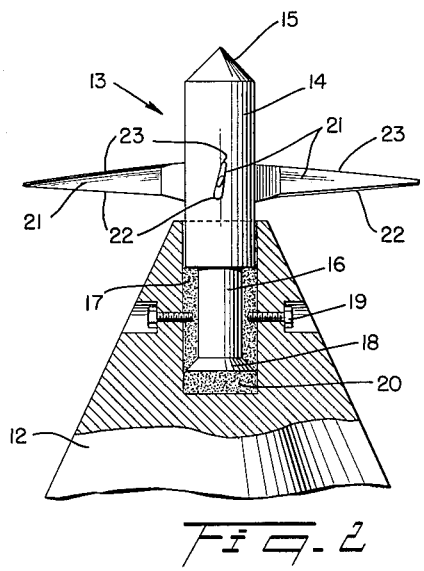
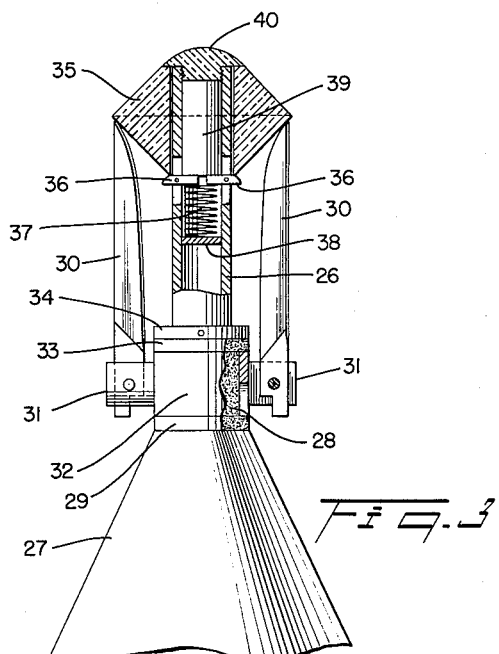
INVENTOR.
JOSEPH de FORAS
BY
George F. DesMarais
ATTORNEY

United States Patent Office 3,093,074
Patented June 11, 1963

3,093,074
MEANS FOR PROTECTING FLIGHT VEHICLES FROM INJURY ATTRIBUTABLE TO HEAT OF AIR FRICTION
Joseph de Foras, Chateau de Thuiset, Thonon, Haute-Savoie, France
Filed Jan. 8, 1960, Ser. No. 1,226
4 Claims. (Cl. 102—49)

This invention relates to means for protecting the body of a flight vehicle from overheating because of air friction which normally develops during the travel of a vehicle through the atmosphere. Among the objects of the invention is to provide mechanical means whereby the relative velocity of the air coming into contact with a moving vehicle is reduced to below the velocity of the vehicle with respect to the main body of air outside of the envelope or layer of air immediately adjacent the skin of the vehicle.

Another object of the invention is to provide a mechanical device with a working member having the capacity to absorb with diffuse heat generated from friction of oncoming air without destroying itself within such time as is required for the member to function to prevent overheating of a vehicle carrying the member. The working member generally resembles a thrust-developing air propeller but distinguishes structurally from such a propeller in composition and in the character of its blades. The blades or arms are fashioned to cause oncoming air to rotate the member and at the same time to deflect the air into a layer of turbulent air flowing rearwardly of the blades and along the skin or surface of the body of a moving vehicle in advance of which the working element is rotatably mounted. The blades, in effect, reduce the relative velocity of the air layer with respect to the vehicle to below the velocity of the vehicle with respect to the main body of air outside of the air layer adjacent the skin or surface of the vehicle. As a result of the reduced velocity of the air at the skin of the vehicle, the heat generated from air friction on the skin of the vehicle body is less than otherwise would have occurred had the full force of the oncoming air been directed onto the vehicle body.

The bladed member is mounted forward of the main body of the vehicle so that it shields the vehicle from part of the energy of the surrounding air which would be available to give rise to a higher temperature at the skin of the vehicle, but for the presence of the bladed member forward of the vehicle. The bladed member is composed of a refractory material, or is provided with an exterior of refractory material, capable of withstanding the heat developed from air friction and of absorbing and dissipating part of the heat absorbed for the short time prevailing during which the vehicle is travelling through air at a velocity which would be effective to generate heat from air friction at a sufficiently high rate as to damage the vehicle. Other features and advantages will appear from the following description of means embodying the invention.

The mechanical device of the present invention is useful in conjunction with rocket-propelled vehicles and other flight vehicles travelling at high velocities, including missiles and airframes of various types, and it may be used for preventing of overheating of airfoils, windshields, and other protuberances for which protection is desired against heat resulting from air friction. In the interest of simplifying the disclosure, the invention will be described herein in association with the nose shield or nose cone of a rocket, but it is intended that the term "nose shield" be understood to identify any part of a flight vehicle having an outer surface which is ordinarily subjected to heating because of air friction.

In the following description and in the claims, various details will be identified by specific names for convenience, but they are intended to be as generic in their application as the art will permit.

In the drawing, FIG. 1 is illustrative of the application of the invention to a rocket or other form of flight vehicle;

FIG. 2 is an enlarged view of the forward end of the flight vehicle illustrated in FIG. 1 with part of the nose shield shown in section along the longitudinal axis thereof; and FIG. 3 illustrates a modification of the invention employing blades adapted for folding into inactive positions.

The rocket illustrated in FIG. 1 is intended to symbolize any form of rocket or other flight vehicle. In general, a rocket has a body 10 containing the usual motor or motors which produce and expel products of combustion at high velocity through an exhaust tube having a nozzle 11. 12 is a nose cone or shield which is initially secured to the body 10 and from which it may be automatically separated, if desired, after the motors have performed their function of accelerating the nose cone sufficiently to acquire the necessary momentum for sustaining motion. The nose shield may contain a guidance system and such other instrumentation or payload required for any particular purpose. Further elaboration on the physical aspects and working features of a rocket or other flight vehicle is not essential since the present invention is concerned with any vehicle having a nose shield which is normally subject to heating as it travels through the atmosphere, regardless of its purpose and the manner in which its momentum is provided.

In the rocket illustrated, a mechanical device 13 is mounted to rotate on the axis of the rocket. The device comprises a hub member 14 having a forwardly disposed tapering surface 15 and a shaft 16 adapted to be journalled in a bearing 17 which is contained within a bore at the forward end of the nose shield. The rearward end of the shaft is provided with an enlargement 18 which engages the inner end of the bearing 17 to thereby avoid withdrawal of the shaft from its mounted position. The bearing 17 may be held in position by any suitable means as by a plurality of bolts 19 which extend inwardly through the shield. The end thrust of the member 13 is counteracted by a thrust bearing, such as a disk 20, for example. In the interest of providing a bearing structure sufficiently rugged and heat-resistant to function properly under the conditions to be encountered, high heat-resistant material such as graphite bearing material, is employed, although any other suitable type of bearing may be used, it being understood that the device is required to function for only a relatively short time. The hub member 14 and the blades 21 are made of a suitable refractory material which can resist or retard deterioration when subjected to the high temperatures to which they will be exposed.

The mechanical device illustrated in FIG. 2 is provided with four blades 21 disposed around and supported from the hub member 14 in balanced relationship; but two or three blades may be used. The member 14 and the blades are made of a suitable metallic refractory composition, covered or not with a suitable ceramic.

The blades are fixed to the hub and pitched at a high angle with respect to the plane of their rotation, whereby only a small component of the air flowing in the axial direction of the hub will be effective for causing their rotation. The angle of the blades should not be less than 45° to produce a thickened layer of agitated air around the body of the vehicle, but an angle approaching 90° will accomplish the desired results for rockets travelling at very high speed.

The cross-section of each blade is such that its trailing or rearward edge 22 is thicker than its forward edge 23, as is generally illustrated in the central blade shown in FIG. 2. The section is shaped as to offer as little head-resistance as possible, and to contribute to the agitation and turbulence of the air which passes through the plane of the blades.

The modified form of mechanical device illustrated in FIG. 3 includes a hollow supporting shaft 26 fixed to a nose shield 27. A bearing 28 and a washer 29 made out of bearing material surround the shaft. Two blades 30 are pivotally mounted on lugs 31 which are secured to diametrically opposite surfaces of a collar 32 which is free to rotate outside of the bearing 28. A bearing washer 33 is located on the shaft between the collar and a ring 34 which is staked to the shaft and prevents axial displacement of the collar.

The blades remain folded against the shaft while inactive and until such time that they are pivoted outwardly about their pivots by the rearward motion of a ring member 35 which is slidably mounted on the shaft 26. The ring member 35 is normally prevented from sliding rearwardly by latches 36 which are pivotally mounted in slots in the hollow shaft 26. Spring means 37, located between an abutment 38 and the inner ends of the latches 36, normally holds the latches in contact with a time fuse 39 or other timing device which is located interiorly of the hollow shaft 26. A cap 40, secured to the shaft 26, engages the forward end of the ring member 35 and prevents movement of the ring member towards the forward end of the shaft.

The cap 40 and the ring member 35 are constituted of ceramic or of any other suitable heat-resistant materials. The ring member has the form of two hollowed truncated cones arranged with their bases adjoining and with the most rearward conical surface sloped to cam the blades outwardly whenever the ring member is released from its latched position and is impelled rearwardly by air pressure on its forward surface.

The firing of the timing device 39 is set to pivot the latches 36 and compress the spring 37 to effect the release of the ring member at a predetermined time, as, for example, before or during the re-entry of a nose cone or shield into the fringe of the atmosphere, or just before the carrying vehicle attains the velocity at which the friction of the air would develop sufficient heat to cause thermal injury to the vehicle. As the vehicle moves through the atmosphere the released ring member is moved rearwardly by the force of the air sufficiently to move and expose the retracted blades to the oncoming air so that they may be thereby pivoted to extended positions radially from the collar 32. In their extended positions the blades and the collar as a unitary propeller function in the manner hereinbefore described to minimize and thereby nullify the adverse effects of aerodynamic heating.

The foregoing is considered as illustrative of the invention and it is self-evident that various changes may be made in the details of construction without departing from the spirit and scope of the invention as set forth in the appended claims.

What is claimed is:

1. In a device for protecting a rocket-propelled flight vehicle from injury attributable to heat of air friction, a rocket-propelled flight vehicle, a nose shield mounted to the forward end of said flight vehicle, a freely rotatable propeller-like baffle member comprising a hub and radial arms fixed in said hub, each of said radial arms having forward and aft straightline edges slightly offset from one another in the direction of rotation of said baffle member, said hub and arms comprising heat-resistant refractory material, a shaft extending rearwardly from said hub, lateral and thrust-resisting bearings supporting said shaft at the forward end of said flight vehicle in a manner to permit said shaft and said baffle member to freely rotate from the action of air on said arms as said flight vehicle moves through the atmosphere, whereby to create turbulence in the air passing through the plane of the arms and moving along the exterior surfaces of said flight vehicle.

2. In combination with a rocket propelled flight vehicle, a nose shield, means for protecting the nose shield from deleterious aerodynamic heating normally caused by air friction from the movement of air along the skin of a body travelling through the atmosphere at high velocity, said protecting means comprising a rotatable baffle member mounted to turn freely in a plane substantially perpendicular to the direction of flight of the nose shield, said baffle member carrying a plurality of substantially plano-arms extending radially outwardly from the axis of rotation of said member in the path of oncoming air forward of the nose shield, the median plane of each of said plano-arms disposed at an angle in excess of 45° with the plane of rotation of said arms whereby a small component of force of the oncoming air is effective for imparting rotation to said rotatable baffle member, and means for rotatably mounting said member on said nose shield with said arms disposed forwardly of the nose shield so that particles of the oncoming air encountering said member and said arms and passing between said arms are agitated and form a protecting envelope of turbulent air passing along the skin of the nose shield, said mounting means including a stub axle projecting rearwardly from said baffle member, and bearings for supporting said stub axle.

3. The combination set forth in claim 2 wherein said rotatable member is covered with a ceramic.

4. In a rocket, the combination of a nose shield at the forward end of the rocket, a baffle located forwardly of said nose shield, said baffle comprising a hub member mounted on a stub axle extending rearwardly from said hub member and a plurality of arms carried by said hub member, said hub member having a forwardly pointed conical surface at the center of rotation of said baffle, said arms disposed in a plane perpendicular to the axis of said stub axle and forward of said nose shield for affecting the velocity condition of air encountered thereby, each of said arms extending radially outwardly from said hub member and having lineal leading and trailing edges tapering towards the extended end of the arm, said trailing edge being wider than the leading edge, said leading and trailing edges bordering flat surfaces defining opposite faces of the arm whereby said opposite flat surfaces are substantially triangular, said flat surfaces angularly inclined at a high angle with respect to the plane of rotation of said baffle so that but a modicum of the total velocity energy of air encountered by the arms is effective to cause rotation of the baffle, and means rotatably mounting said stub axle on said nose shield, whereby said baffle dissipates heat from the air encountered thereby and reduces the velocity of the air adjacent the nose shield.

References Cited in the file of this patent

UNITED STATES PATENTS

| | | |
|---|---|---|
| 536,565 | Crowley | Mar. 26, 1895 |
| 1,166,879 | Alard | Jan. 4, 1916 |
| 1,201,763 | Rimailho | Oct. 17, 1916 |
| 1,534,126 | Lucas | Apr. 21, 1925 |
| 2,400,002 | Hebard | May 7, 1946 |
| 2,465,401 | Skinner | Mar. 29, 1949 |
| 2,511,872 | Parker | June 20, 1950 |
| 2,595,061 | Downey | Apr. 29, 1952 |
| 2,623,465 | Jasse | Dec. 30, 1952 |
| 2,839,998 | Rabinow | June 24, 1958 |
| 2,947,108 | Dodd | Aug. 2, 1960 |